US009535884B1

(12) United States Patent
Chatterjee et al.

(10) Patent No.: US 9,535,884 B1
(45) Date of Patent: Jan. 3, 2017

(54) FINDING AN END-OF-BODY WITHIN CONTENT

(75) Inventors: Preetha Chatterjee, Seattle, WA (US); Tom Killalea, Seattle, WA (US); Janna Hamaker, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 12/894,417

(22) Filed: Sep. 30, 2010

(51) Int. Cl.
*G06F 17/00* (2006.01)
*G06F 17/21* (2006.01)

(52) U.S. Cl.
CPC .................................. *G06F 17/218* (2013.01)

(58) Field of Classification Search
CPC ..................................................... G06F 17/218
USPC ......................................................... 715/234
See application file for complete search history.

(56) References Cited

U.S. PATENT DOCUMENTS

| | | | |
|---|---|---|---|
| 5,663,748 A | 9/1997 | Huffman et al. | |
| 5,697,793 A | 12/1997 | Huffman et al. | |
| 5,743,746 A | 4/1998 | Ho et al. | |
| 6,098,064 A | 8/2000 | Pirolli et al. | |
| 6,544,294 B1 | 4/2003 | Greenfield et al. | |
| 6,584,480 B1* | 6/2003 | Ferrel et al. | 715/205 |
| 6,853,982 B2 | 2/2005 | Smith et al. | |
| 6,947,922 B1 | 9/2005 | Glance | |
| 6,963,848 B1 | 11/2005 | Brinkerhoff | |
| 7,103,848 B2 | 9/2006 | Barsness et al. | |
| 7,315,826 B1 | 1/2008 | Guheen et al. | |
| 7,490,045 B1 | 2/2009 | Flores et al. | |
| 7,545,398 B2 | 6/2009 | Sawada | |
| 7,552,068 B1 | 6/2009 | Brinkerhoff | |
| 7,636,677 B1 | 12/2009 | McGonigal et al. | |
| 8,046,272 B1 | 10/2011 | Nguyen | |
| 8,103,665 B2 | 1/2012 | Abbott et al. | |
| 8,341,513 B1 | 12/2012 | Lattyak et al. | |
| 8,692,763 B1 | 4/2014 | Kim | |
| 2001/0007980 A1* | 7/2001 | Ishibashi et al. | 705/26 |
| 2001/0011366 A1 | 8/2001 | Beck et al. | |
| 2001/0049623 A1 | 12/2001 | Aggarwal et al. | |
| 2002/0174145 A1* | 11/2002 | Duga et al. | 707/513 |
| 2003/0093336 A1 | 5/2003 | Ukita et al. | |
| 2003/0193423 A1 | 10/2003 | Ng et al. | |
| 2003/0210226 A1 | 11/2003 | Ho et al. | |
| 2003/0225609 A1 | 12/2003 | Klipfell, III | |
| 2004/0030781 A1 | 2/2004 | Etesse et al. | |
| 2004/0140975 A1 | 7/2004 | Saito et al. | |
| 2004/0181746 A1* | 9/2004 | McLure et al. | 715/500 |

(Continued)

OTHER PUBLICATIONS

Carey, "13 Summer reading programs avoid brain drain and get rewards", Examiner.com, Family & Parenting, Jun. 3, 2010, Houston Family Examiner, pp. 1-pp. 3.

(Continued)

*Primary Examiner* — Laurie Ries
(74) *Attorney, Agent, or Firm* — Lee & Hayes, PLLC

(57) ABSTRACT

Digital content such as eBook may have several sections such as front matter, body matter, back matter, and so forth. To aid in the use of the content, it is worthwhile to find an end-of-body matter or other section breaks. As described herein, these sections may be determined by looking for keywords, specific formatting, manual intervention, last position read, and so forth. Once determined, tags may be generated which designate boundaries of these sections. These tags may then be used during consumption of the content.

23 Claims, 13 Drawing Sheets

(56) References Cited

U.S. PATENT DOCUMENTS

| | | | |
|---|---|---|---|
| 2005/0027671 A1* | 2/2005 | Hind et al. | 707/1 |
| 2005/0071864 A1 | 3/2005 | Denoue et al. | |
| 2005/0267861 A1 | 12/2005 | Jassin et al. | |
| 2006/0041538 A1 | 2/2006 | King et al. | |
| 2006/0093998 A1 | 5/2006 | Vertegaal | |
| 2006/0122716 A1 | 6/2006 | Bortnik et al. | |
| 2006/0229944 A1 | 10/2006 | Walker et al. | |
| 2006/0287046 A1 | 12/2006 | Walker et al. | |
| 2007/0011039 A1 | 1/2007 | Oddo | |
| 2007/0043817 A1 | 2/2007 | Oliver et al. | |
| 2007/0061755 A1* | 3/2007 | Taboada et al. | 715/818 |
| 2007/0064626 A1 | 3/2007 | Evans | |
| 2007/0078675 A1 | 4/2007 | Kaplan | |
| 2007/0298385 A1 | 12/2007 | Jenkins et al. | |
| 2007/0298399 A1 | 12/2007 | Shao et al. | |
| 2008/0077492 A1 | 3/2008 | Ho et al. | |
| 2008/0136838 A1 | 6/2008 | Goede et al. | |
| 2008/0140652 A1 | 6/2008 | Millman et al. | |
| 2008/0141182 A1 | 6/2008 | Barsness et al. | |
| 2008/0162206 A1 | 7/2008 | Mak et al. | |
| 2008/0199042 A1 | 8/2008 | Smith | |
| 2008/0201348 A1 | 8/2008 | Edmonds et al. | |
| 2008/0227076 A1 | 9/2008 | Johnson | |
| 2008/0229182 A1 | 9/2008 | Hendricks et al. | |
| 2008/0249893 A1 | 10/2008 | Knoll et al. | |
| 2008/0263014 A1 | 10/2008 | Garijo Mazario et al. | |
| 2008/0288862 A1* | 11/2008 | Smetters et al. | 715/255 |
| 2009/0024621 A1 | 1/2009 | Burgess et al. | |
| 2009/0031244 A1 | 1/2009 | Brezina et al. | |
| 2009/0070454 A1 | 3/2009 | McKinnon, III et al. | |
| 2009/0083116 A1 | 3/2009 | Svendsen | |
| 2009/0089177 A1 | 4/2009 | Dayton et al. | |
| 2009/0156310 A1 | 6/2009 | Fargo | |
| 2009/0240647 A1 | 9/2009 | Green et al. | |
| 2009/0300670 A1 | 12/2009 | Barish | |
| 2009/0326953 A1 | 12/2009 | Peralta Gimenez et al. | |
| 2009/0326970 A1 | 12/2009 | Estrada et al. | |
| 2010/0070899 A1 | 3/2010 | Hunt et al. | |
| 2010/0076274 A1 | 3/2010 | Severson | |
| 2010/0086130 A1 | 4/2010 | Wang et al. | |
| 2010/0092095 A1 | 4/2010 | King et al. | |
| 2010/0122178 A1 | 5/2010 | Konig et al. | |
| 2010/0169906 A1 | 7/2010 | Takahashi | |
| 2010/0174596 A1 | 7/2010 | Gilman et al. | |
| 2010/0198693 A1 | 8/2010 | Lidwell et al. | |
| 2010/0275233 A1 | 10/2010 | Soohoo et al. | |
| 2010/0306122 A1 | 12/2010 | Shaffer | |
| 2010/0313161 A1 | 12/2010 | Le Chevalier et al. | |
| 2010/0315359 A1 | 12/2010 | Seong et al. | |
| 2011/0010307 A1 | 1/2011 | Bates et al. | |
| 2011/0040657 A1 | 2/2011 | Roswell | |
| 2011/0050594 A1 | 3/2011 | Kim et al. | |
| 2011/0066965 A1 | 3/2011 | Choi | |
| 2011/0081867 A1 | 4/2011 | Issa et al. | |
| 2011/0082719 A1 | 4/2011 | Dutta | |
| 2011/0087955 A1 | 4/2011 | Ho et al. | |
| 2011/0191692 A1 | 8/2011 | Walsh et al. | |
| 2011/0191701 A1 | 8/2011 | Kim et al. | |
| 2011/0195388 A1 | 8/2011 | Henshall et al. | |
| 2011/0320276 A1 | 12/2011 | Ray et al. | |
| 2012/0001923 A1 | 1/2012 | Weinzimmer et al. | |
| 2012/0005617 A1 | 1/2012 | Lee et al. | |
| 2012/0016772 A1 | 1/2012 | Sadagopan et al. | |
| 2012/0030227 A1 | 2/2012 | Mital et al. | |
| 2012/0041967 A1 | 2/2012 | Askey et al. | |
| 2012/0206472 A1* | 8/2012 | Kandekar et al. | 345/581 |

OTHER PUBLICATIONS

Hart, "Summer 2009: Summer Reading Progams with a Reward for Kids", Jun. 4, 2009, <<http://voices.yahoo.com>>, pp. 1-pp. 3.
Non-Final Office Action for U.S. Appl. No. 12/888,086, mailed on Apr. 16, 2012, Simoina K. Dargan et al., "Content Tracking and Reward Architecture", 19 pages.
Non-Final Office Action for U.S. Appl. No. 13/294,883, mailed on May 8, 2012, Aaron James Dykstra et al., "Content Statistics ", 31 pages.
Final Office Action for U.S. Appl. No. 12/859,705, mailed on Aug. 15, 2012, Dykstra et al., "Content Completion Activities", 49 pages.
Non-Final Office Action for U.S. Appl. No. 12/859,662, mailed on Aug. 23, 2012, Aaron James Dykstra et al., "Content Completion Recommendations", 20 pages.
Howard, "Peer Influences on Young Teen Readers an Emerging Taxonomy", Young Adult Library Services 8.2(Winter 2010), retrieved on Dec. 18, 2012, at http://search.proquest.com/docview/217681821/13B1452426F2ECBEB3C/14?accountid=14753, 9 pages.
MacGibbon, "Pack a bag of books for your summer vacation", The Times-Trascript, at http://search.proquest.com/docview/422986352/13B14EAE966F93C82B/1?accountid=14753, retreived on Dec. 18, 2012, 3 pages.
Musgrove, "Waiting for Netflix's Plot to Advance: [Final Edition]", The Washington Post, at http://search.proquest.com/docview/410232502/13AFFBF6A7C2B81DOBE/1?accountid=14753, retrieved on Dec. 14, 2012, 3 pages.
Final Office Action for U.S. Appl. No. 13/294,883, mailed on Jan. 4, 2012, Aaron James Dykstra et al., "Content Statistics ", 44 pages.
Office action for U.S. Appl. No. 12/859,662, mailed on Dec. 28, 2012, Dykstra et al., "Content Completion Recommendations", 22 pages.
Office Action for U.S. Appl. No. 12/888,086, mailed on Mar. 26, 2014, Simoina K. Dargan, "Content Tracking and Reward Architecture", 16 pages.
Office Action for U.S. Appl. No. 12/859,705, mailed on Apr. 9, 2014, Aaron James Dykstra, "Content Completion Activities", 52 pages.
Proquest.com, "Discover and Share the Best of the Web with PrkL8 for IPhone: Personalized Web Discovery with Easy Sharing on Facebook", PR Newswire Association LLC, at http://search.proquest.com/docview/450465234/13E60942898E781AA21/1?accountid=14753. on May 31, 2013, 2010, 2 pages.
Proquest.com, "Next Plan Commission Meeting Taking Place, Aug. 18", HT Media LTD, at http://search.proquest.com/docview/744504301/13E60942898E781AA21/3?accountid=14753, on May 31, 2013, 2010, 2 pages.
YouTube.com, "Clarkson University Rap", at http:www.youtube.com/watch?v=lezesOvNoWE&feature=featured, on May 31, 2013, 2009, 2 pages.
Non-Final Office Action for U.S. Appl. No. 13/294,855, mailed on Oct. 26, 2012, Simoina K. Dargan et al., "Content Rewards", 28 pages.
Final Office Action for U.S. Appl. No. 12/888,086, mailed on Oct. 26, 2012, Simoina K. Dargan et al., "Content Tracking and Reward Architecture", 24 pages.
Final Office Action for U.S. Appl. No. 12/859,686, mailed on Nov. 9, 2012, Aaron James Dykstra et al., "Content Completion Reports", 17 pages.
Office action for U.S. Appl. No. 12/894,417, mailed on Sep. 14, 2012, Chatterjee et al., "Finding an End-of-Body Within Content", 27 pages.
Office action for U.S. Appl. No. 13/294,883, mailed on Aug. 20, 2013, Dykstra et al., "Content Statistics ", 52 pages.
Office action for U.S. Appl. No. 12/859,705, mailed on Sep. 6, 2013, Dykstra et al., "Content Completion Activities", 51 pages.
Office action for U.S. Appl. No. 12/888,086, mailed on Oct. 2, 2014, Vasen et al., "Content Tracking and Reward Architecture," 17 pages.
Office Action for U.S. Appl. No. 13/294,883, mailed on Apr. 2, 2014, Aaron James Dykstra, "Content Statistics," 63 pages.
Office action for U.S. Appl. No. 12/859,686, mailed on Jul. 30, 2014, Dykstra et al., "Content Completion Reports," 32 pages.
Office Action for U.S. Appl. No. 12/859,705, mailed on Aug. 18, 2014, Aaron James Dykstra, "Content Completion Activities," 56 pages.
Office Action for U.S. Appl. No. 13/294,883, mailed on Nov. 7, 2014, Aaron James Dykstra, "Content Statistics," 51 pages.

(56) References Cited

OTHER PUBLICATIONS

Office Action for U.S. Appl. No. 12/859,705, mailed on Dec. 9, 2014, Aaron James Dykstra, "Content Completion Activities," 9 pages.

U.S. Appl. No. 12/859,662, filed Aug. 19, 2010, Dykstra, et al., "Content Completion Recommendations".

U.S. Appl. No. 12/859,705, filed Aug. 19, 2010, Dykstra, et al., "Content Completion Activities".

U.S. Appl. No. 61/375,195, filed Aug. 19, 2010, Dargan, et al., "Content Tracking and Reward Architecture".

Office action for U.S. Appl. No. 12/859,705, mailed on May 7, 2015, Dykstra et al., "Content Completion Activities", 8 pages.

Office Action for U.S. Appl. No. 13/294,883, mailed on Jun. 25, 2015, Aaron James Dykstra, "Content Statistics", 62 pages.

Final Office Action for U.S. Appl. No. 12/888,086, mailed on Jul. 13, 2015, Simoina K. Dargan, "Content Tracking and Reward Architecture", 22 pages.

Office action for U.S. Appl. No. 13/294,883, mailed on Feb. 12, 2016, Dykstra et al., "Content Statistics", 64 pages.

Final Office Action for U.S. Appl. No. 12/859,686, mailed on Feb. 11, 2015, Aaron James Dykstra, "Content Completion Reports", 39 pages.

Office Action for U.S. Appl. No. 13/294,855, mailed on Feb. 18, 2015, Simoina K. Daragan, "Content Rewards", 23 pages.

Office action for U.S. Appl. No. 13/294,855 mailed on Sep. 10, 2015, Vasen et al., "Content Rewards", 24 pages.

Office action for U.S. Appl. No. 12/859,686 mailed on Oct. 6, 2015, Dykstra et al., "Content Completion Reports", 32 pages.

Office action for U.S. Appl. No. 12/859,705 mailed on Oct. 16, 2015, Dykstra et al., "Content Completion Activities", 10 pages.

Office action for U.S. Appl. No. 12/859,705, mailed on Mar. 15, 2016, Dykstra et al., "Content Completion Activities", 55 pages.

Office action for U.S. Appl. No. 12/859,686, mailed on May 5, 2016, Dykstraet al.,"Content Completion Reports", 33 pages.

U.S. Appl. No. 12/859,686, filed Aug. 19, 2010, Lee & Hayes, "Content Completion Reports".

U.S. Appl. No. 12/888,086, filed Sep. 22, 2010, Lee & Hayes, "Content Tracking and Reward Architecture".

"How to Write a Book Review", retrieved on Jan. 25, 2012 at http://web.archive.org/web/20090420124930/http://www.lavc.edu/Library/bookreview.htm, Los Angeles Valley College Library, 4 pages.

Office action for U.S. Appl. No. 12/859,705, mailed on Feb. 3, 2012, Dykstra et al., "Content Completion Activities", 45 pages.

Non-Final Office Action for U.S. Appl. No. 12/859,686, mailed on Feb. 6, 2012, Aaron James Dykstra et al., "Content Completion Reports", 14 pages.

\* cited by examiner

FINDING AN END-OF-BODY WITHIN CONTENT

BACKGROUND

Electronic devices such as eBook readers ("eBook readers"), cellular telephones, portable media players, tablet computers, netbooks, desktop computers, and the like may display digital content such as eBooks ("eBooks") or other electronic media content to a user. Given the incredible growth in the availability of digital content and variability of formatting, it can be cumbersome to determine where transitions occur between sections of a book, such as front matter, body matter, and back matter.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
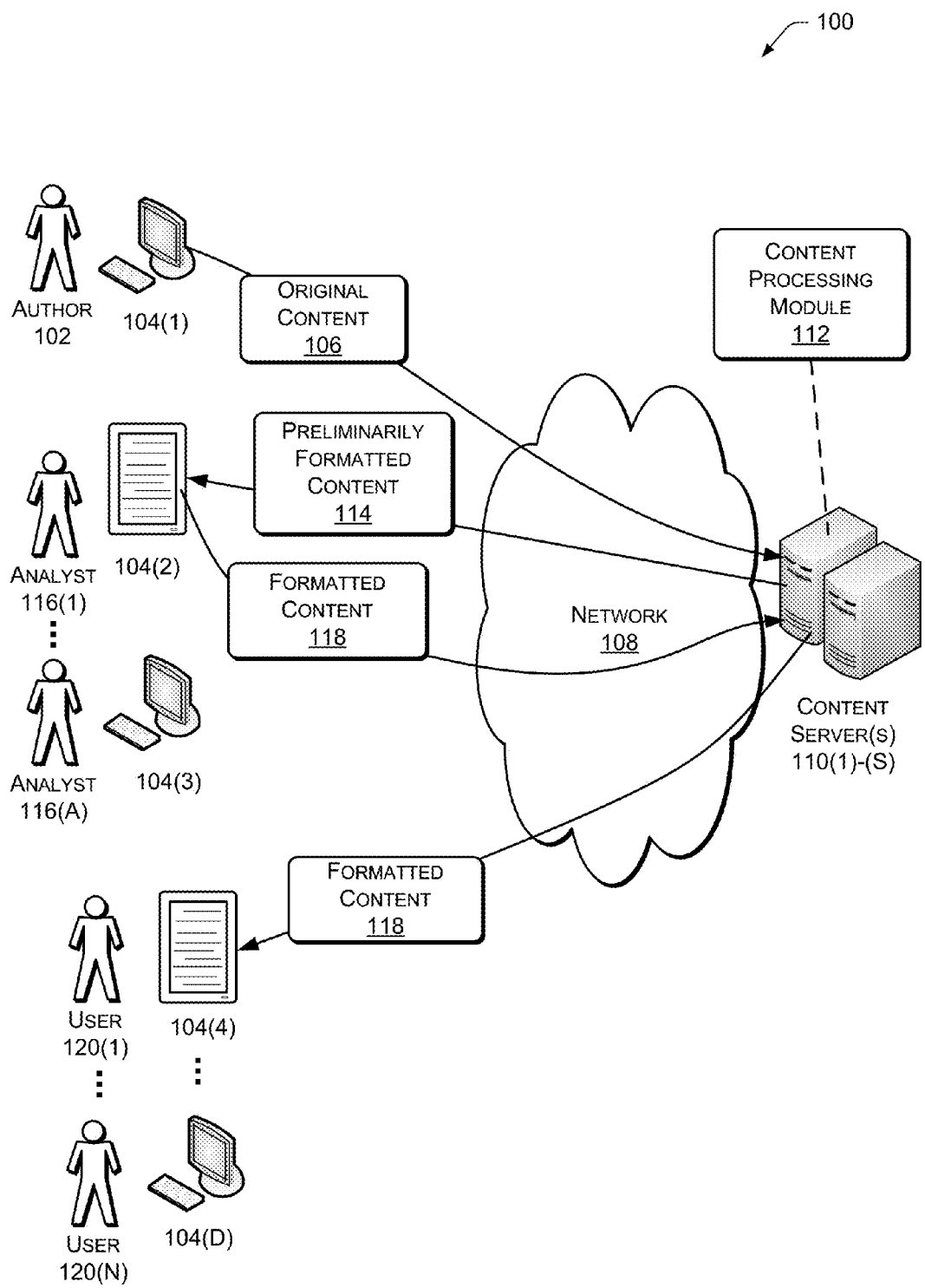
FIG. 1 is a block diagram of an illustrative network architecture configured to format digital content within a content processing module.

Digital content continues to proliferate in terms of the volume of content being created, the numbers of devices that can play digital content, and the numbers of users who are accessing and consuming digital content. Digital content may include eBooks, video, multimedia presentations, audio, and so forth. Users are accustomed to particular presentations of different types of content, which may vary according to the type of content. For example, songs on an album may be segregated into separate tracks, video may have scenes, a book may have front matter, body matter including chapters, back matter, and so forth. Providing an expected presentation to a user increases user satisfaction and encourages consumption of digital content.

Given the growing body of digital content offered by a large number of publishers and put forth by a larger number of authors, formatting of digital content to a uniform standard suitable for presentation is a challenge. This challenge is further exacerbated by a growing trend of self-publication. Individual publishers or authors may omit, or incorrectly add, breaks between sections. Proper breaks between sections provide a presentation which is expected by the user, while also providing information suitable for analysis. For example, it may be useful to a publisher to realize that a large number of users are accessing back matter, in order to determine whether an update to the section is desired for a new edition.

Described in this application are techniques and systems suitable for determining breaks or transitions between sections of digital content, and formatting the digital content with tags indicating these breaks. Content may be received from an author, publisher, or other originating entity at a content server. A content processing module within the content server analyzes the content to determine the position of transitions from one section to another. For example, in an eBook, the content processing module may determine the position of breaks between front matter to body matter, and body matter to back matter. In other implementations, other portions of the content may be determined and identified, such as chapters, indices, bibliographies, and so forth.

Once these breaks are identified, formatting may be generated. This formatting may include the creation of tags which are associated with the position at which a break has been identified, or for a determined interval of the content. Tags may include entries using hypertext markup language (HTML) tag, extensible markup language (XML), programming script, plain text of pre-determined parameters, and so forth. Tags may be associated with the position either by placement inline with the content, be placed within a file separate from the content, or a combination of the two. For example, a formatting file may contain the location within the content of one or more breaks.

In one implementation, the content processing module may generate the formatted content from the original content automatically, that is, without any human intervention. This processing may include identifying keywords, using last position read, analyzing changes in formatting, analyzing changes in reading speed, and so forth.

In other implementations, processing of the content may incorporate human users to assess an automatically generated preliminarily formatted content. For example, humans may approve or modify an automatically generated break showing an end-of-body matter. These humans may either be users, such as those reading the book, or analysts who are confirming the automated formatting.

While content processing is described in the context of textual content, the concepts described herein are also applicable to processing of other digital content, such as multimedia, audio, video, and so forth. Also, while processes are described as being implemented using eBook reader devices, digital content may be processed for display on other devices, such as cellular telephones, portable media players, tablet computers, netbooks, notebooks, desktop computers, and the like.

Content Processing Architecture

FIG. 1 is a block diagram of an illustrative network architecture 100 configured to format digital content. This formatting includes the determination of transitions between sections, and the creation of tags or other indicators associated with the position of these transitions which affect the presentation of the digital content to a user.

An author 102, or other originating entity such as a publisher, may use an electronic device 104 to transfer original content 106 via network 108 to one or more content servers, such as the illustrated content servers 110(1)-(S). The electronic device 104 may be embodied in any number of ways, including as a desktop computer, laptop, server, smartphone, eBook reader device, and so forth. In FIG. 1, several devices 104(1), 104(2), . . . , 104(D) are shown embodied as desktop computers and eBook reader devices for discussion purposes.

The original content 106 may include any form of digital content, such as a multimedia item or an eBook. This original content 106 may include some formatting, but may in some cases be lacking specific formatting tags or indicators which are usable during the presentation of the eBook. For example, the original content 106 may comprise an eBook with line breaks and italic fonts, but lack a definitive machine-readable tag recognized by the eBook reader 104 indicating the conclusion of body matter.

The network 108 may be implemented as one or more various networks, such as the Internet, a cable television network, wireless network, wired network, wireless wide area network, and so forth. The content servers 110(1)-(S) may comprise a single server, cluster of servers, data center, and so forth.

At the content servers 110, a content processing module 112 processes the original content 106. Among the various tasks performed by the content processing module 112, it determines positions within the original content 106 which correspond to breaks or transitions between sections. A number of different techniques are described more fully below with reference to FIGS. 4-13. In other implementations, the content processing module 112 may exist on the device 104, such as a user's eBook reader, or be distributed between the device 104 and the content servers 110. The module 112 generates preliminarily formatted content 114 which encompasses the original content 106 and the formatting, including breaks.

In some implementations, the preliminarily formatted content 114 may be presented to a human for approval or modification. As shown here, the preliminarily formatted content 114 is delivered via the network 108 to an analyst 116. The analyst 116 views the presented preliminarily formatted content 114, and may approve the automatically generated formatting or modify it. Approval or modification then results in formatted content 118. The content servers 110 may then distribute formatted content 118 via the network 108 to users 120. Thus, the users 120 view the formatted content 118 which is suited for presentation on their devices 104.

Figure 2:
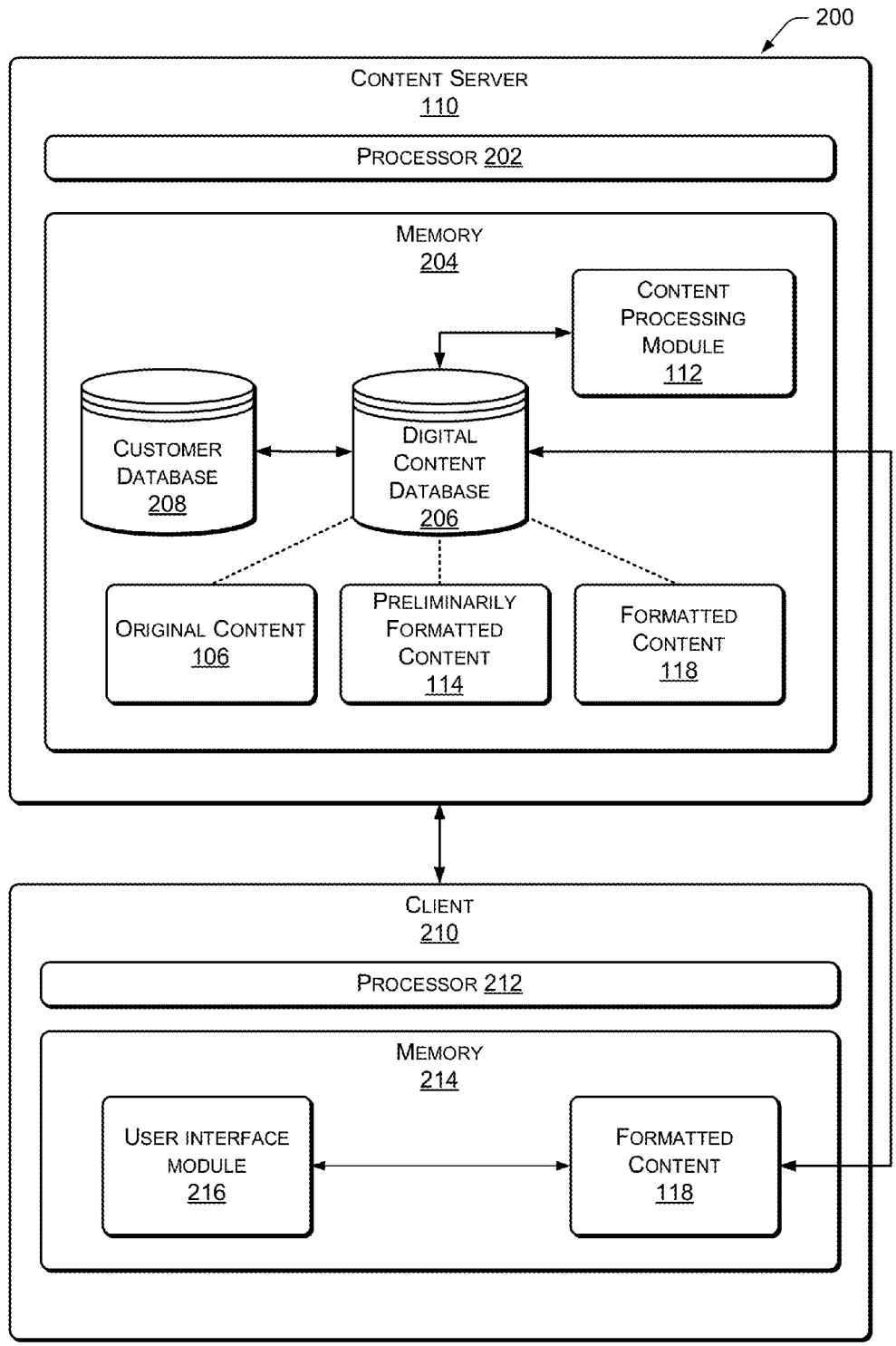
FIG. 2 is a block diagram of an illustrative architecture of a content processing environment.

FIG. 2 is a block diagram of an illustrative architecture of a content processing environment 200. The content processing environment 200 includes one or more servers 110, comprising a processor 202 and a memory 204. The memory 204 may include computer-readable storage media (CRSM). The CRSM may be any available physical media accessible by a computing device to implement the instructions stored thereon. CRSM may include, but is not limited to, random access memory (RAM), read-only memory (ROM), electrically erasable programmable read-only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by a computing device.

A digital content database 206 and a customer database 208 are stored in the memory 204. The digital content database 206 comprises digital content, for example music, books, movies, and so forth. Digital content may include original content 106, preliminarily formatted content 114, and formatted content 118. Digital content may be accessed in common. That is, each user with access to a particular content may access a common copy of that content, or each user may access his or her own discrete copy of content stored in a digital locker. The customer database 208 is accessible by the processor 202 for use in distributing content from the digital content database 206. The customer database 208 comprises information about users participating in the community, access rights to content, and so forth.

The content processing module 112 is also present within memory 204 and accesses the digital content database 206. As described above, the content processing module 112 is configured to analyze the content 106 to make determinations such as the position of transitions from one section to another. FIGS. 4-13 below describe various techniques for determining the position of transitions.

The content server 110 is in communication with a client 210, which may represent any one of the devices 104 shown in FIG. 1. The client 210 comprises a processor 212 and a memory 214. The memory 214 may include computer-readable storage media as described above. Stored in the memory 214 is a user interface module 216. The user interface module 216 may present the formatted content 118, provide user prompts, accept user input, and so forth. The formatted content 118 is stored in the memory 214, or a portion thereof, or retrieved from the server 110, depending on access rights the user may have, available memory, and so forth.

Figure 3:
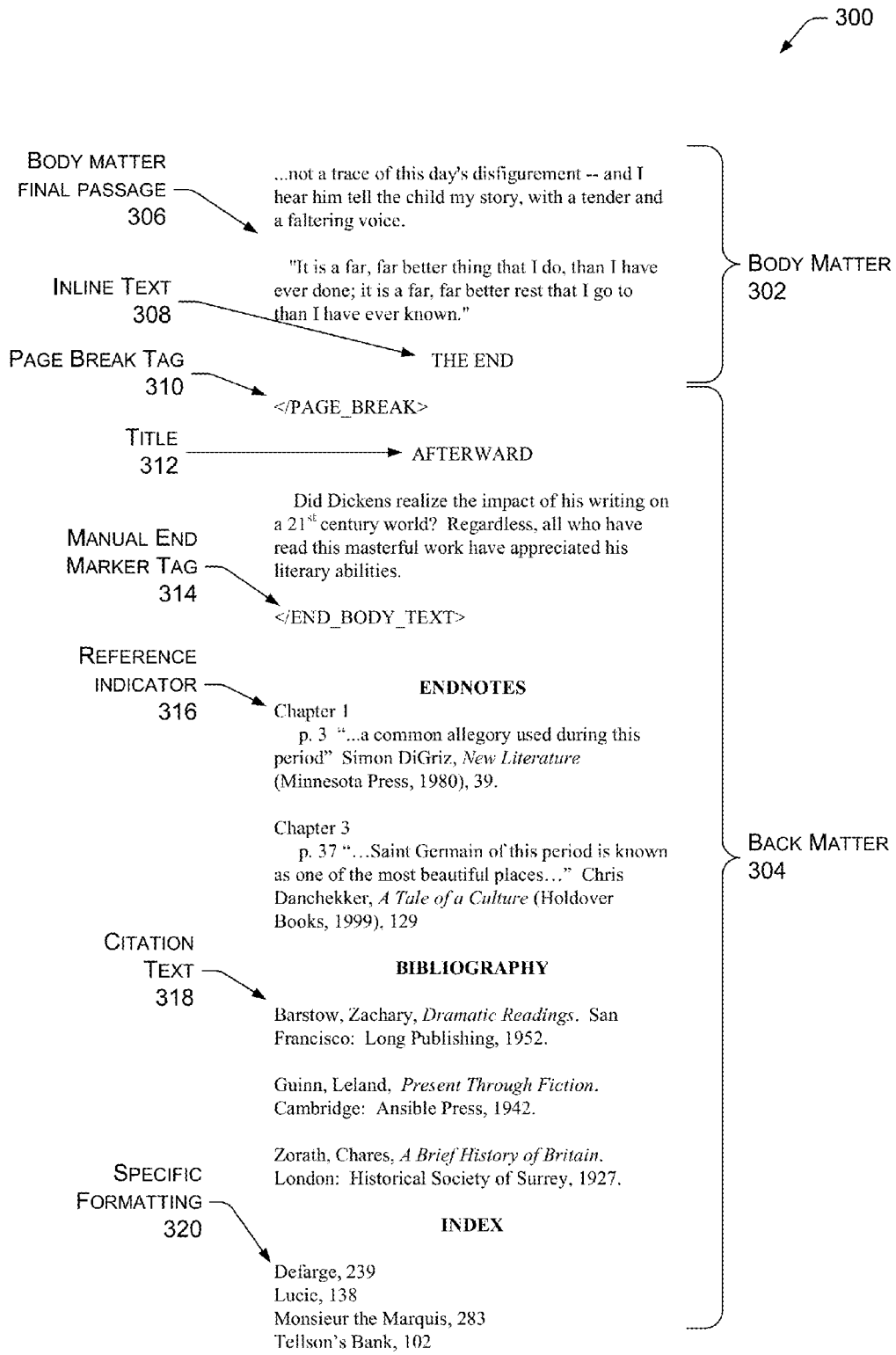
FIG. 3 is a portion of illustrative content depicting various sections of an eBook.

FIG. 3 is a portion of illustrative content 300 depicting various elements of an eBook. An eBook may be considered to have at least three sections: front matter, body matter, and back matter. However, each of these sections is not always present in a given eBook. Each of these sections may in turn have sub-sections, for example chapters within the body matter. The composition of each of these sections may vary from country to country, publisher to publisher, and in some instances, change over time as the conventions of book design change.

Front matter is the first section of a book, and may contain initial material such as a table of contents, foreword, preface, acknowledgement, introduction, dedication, prologue, and so forth. Front matter may have formatting different from other sections such as the body matter. For example the page numbers in front matter may be lowercase roman numerals.

Body matter is the core of the book, and contains the materials that are typically of greatest interest to the reader, for example, the story. The particular formatting of the body matter may vary with the type of work, for example, compare the formatting of a novel with a dictionary. The novel is primarily text with perhaps line and paragraph breaks, while the dictionary may have a more complicated indentation, italicization, and so forth. Regardless, within the body section, the formatting is generally consistent.

Body matter may include subsections, such as chapters, parts, and so forth. Consistently incrementing inline text, for example "Chapter 1," "Chapter 2," and so forth may delineate breaks between subsections. Often, but not always, body matter may conclude with a particular word or phrase. For example, in English books keywords such as "the end," "conclusion," or "fin," and so forth may indicate the conclusion of a section. Presence of other text such as line breaks before and after the keyword may also be considered.

In some implementations, the capitalization or case of these phrases may be considered. For example, "The End" or "THE END" may be considered a keyword, while "the end" does not, to avoid determination of false breaks. As above, presence of other text such as line breaks before and after the keyword may also be considered.

Back matter may be present, and may include appendices, glossaries, bibliographies, indices, and so forth. In some implementations, back matter may also include an epilogue, afterword, conclusion, postscript and so forth. The content processing module 112 may automatically, or with the input from the analyst 116 determine whether portions such as the epilogue, afterword, conclusion, postscript and so forth are to be included within the body matter or the back matter of a particular eBook. As shown in FIG. 3, the concluding portion of body matter 302 as well as back matter 304 are presented.

Within the body matter 302 may be seen a final passage 306 of the text of the eBook. Inline text 308 is text which is part of the content. Here, inline text 308 includes the phrase "THE END" which may be used at least in part to determine an end of the body section 302.

A page break tag 310 is also shown. Tags, including the page break tag 310, may be configured to affect the presentation of the content, but may not be presented to the user. For example, the user may not see the text "" or similar tag but may see the user interface presented which is associated with the page break. Tags may be inline with the text, or separate and associated with a particular position within the file.

The content may include titles 312, such as "AFTERWORD" which is shown here. Titles may be distinguished based upon capitalization, formatting, as well as their correspondence to previously determined keywords. For example, titles may include the keywords "CHAPTER," "FOREWORD," "EPILOGUE," and so forth.

In some implementations, a manual end marker tag 314 may be present. The author 102, a publisher, typesetter, or other entity may insert this manual end marker tag 314 prior to submission to the content servers 110. As above, the user may not see the text "</END_BODY_TEXT>" or similar tag but may instead see the user interface associated with presentation of an end of the book. The placement of the manual end marker tag 314 may reflect the intention of the author 102 to change the location of breaks between the sections. For example, as shown in this illustration, the manual end marker tag 314 is positioned after the conclusion of the afterword text. This is at variance with conventional book design, in which the afterword is usually considered a part of back matter, and not the body matter.

Also illustrated here are reference indicators 316, such as specific formatting, character strings and types of strings which may indicate particular types of material. For example, as shown here, the reference indicators 316 may include the text "Chapter 1" and "p." text used to denote pages, and so forth. These reference indicators 316 may be used to determine sections within the content. Comparison between the reference indicators 316 may be used to disambiguate sections. For example, in the "ENDNOTES" as shown, chapters are delineated with subsequent endnote entries. A determination that the phrase "Chapter" occurs with increasing numbers may result in an erroneous conclusion that the endnotes are part of the body matter 302. To avoid this, a pre-determined threshold distance may be used. For example, when the reference indicators 316 are within a pre-determined threshold distance of 400 characters of one another, the portion is not body matter 302.

Citation text 318 is shown, which conforms to pre-determined citation formats. The presence of citation text 318 may be used to designate sections of text. For example, a plurality of citation text 318 entries, separated by line breaks and proximate to one another, may indicate a listing of citations in a bibliography, such as shown here.

Sections may also be distinguished by analyzing specific formatting 320, such as that shown with a table in an index, table of contents, and so forth. Here, we have a short string of text followed by a comma and a number. This may be analyzed and recognized as an index. In some implementations, this determination may be checked by searching the body matter. For example, a search of the work at page 239 which indicates that the word "Defarge" is present would confirm that the text in this format is likely an index.

Determination of End of Section

Several processes are described below, including those shown in FIGS. 4-5, 7-10, and 12-13. These processes may be implemented in the content processing module 112. Furthermore, while the following processes are described as determining the end of a section, it is recognized that the processes may be equally disposed to determine the beginning of a section, or a transition between sections. These processes are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the following processes are described with reference to the architectures of FIGS. 1-3.

Figure 4:
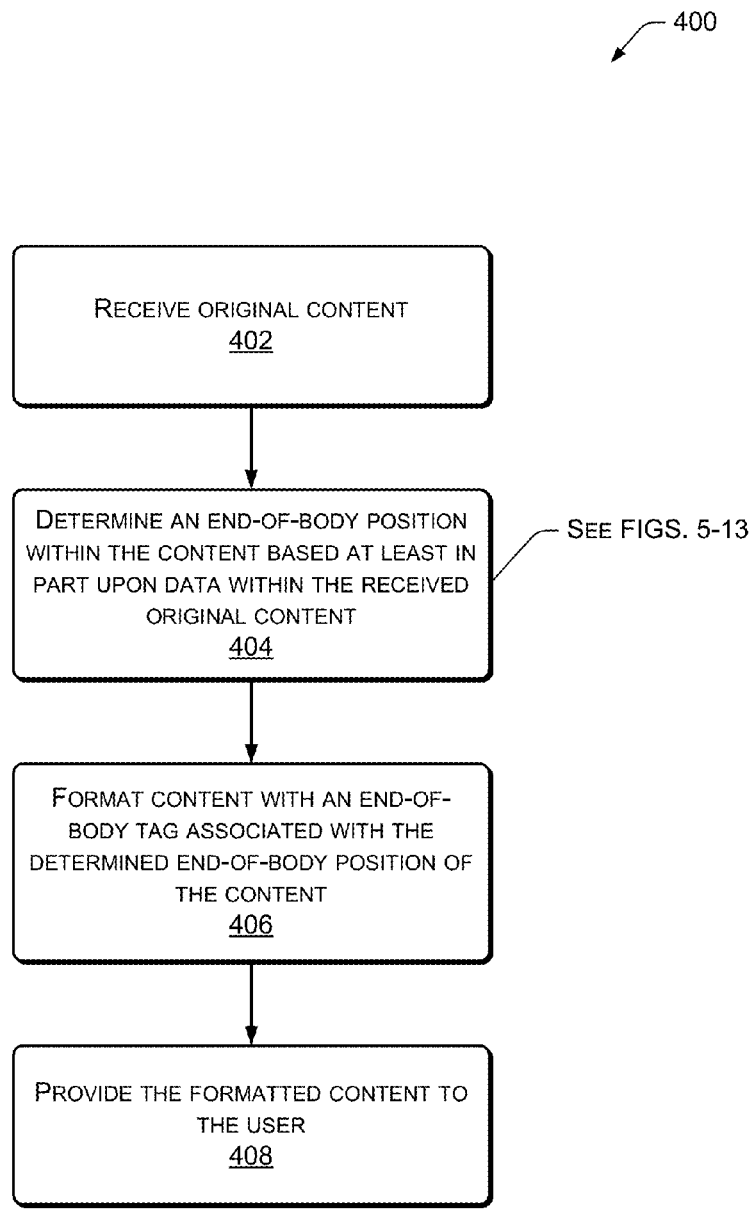
FIG. 4 is a flow diagram of an illustrative process of content processing.

FIG. 4 shows an illustrative process 400 of content processing to create formatted content from original content, such as by generating breaks at transitions between sections. At 402, the content processing module 112 receives original content. For example, an author 102 may upload via network 108 her new book which is ready for publication to the content servers 110.

At 404, an end-of-body position within the content is determined based at least in part upon data within the received original content. The data within the received original content may be structural data, such as formatting, page layout, tags, and so forth. The data within the received original content includes substance such as text in an eBook, audio, video, and so forth. As described below in more detail with regards to FIGS. 5-13, determining the position of the transitions within the content may include analyzing keywords, detecting changes in formatting, detecting changes in page layout, and so forth. In some implementations as described below, user input may also be used to aid the determination or confirmation of transitions. Additionally, combinations of various techniques may be used. For example, keywords and formatting may be used to determine transitions.

At 406, content is formatted with an end-of-body tag associated with the determined end-of-body position of the content. As described above, this tag may be incorporated into the content, or associated with the content in a formatting file.

At 408, the formatted content 118 is provided to the user 120. The user 120, upon accessing the formatted content 118, is thus presented with section breaks, and a clear indication of where within the eBook the determined of the body matter 302 is via appropriate formatting.

Figure 5:
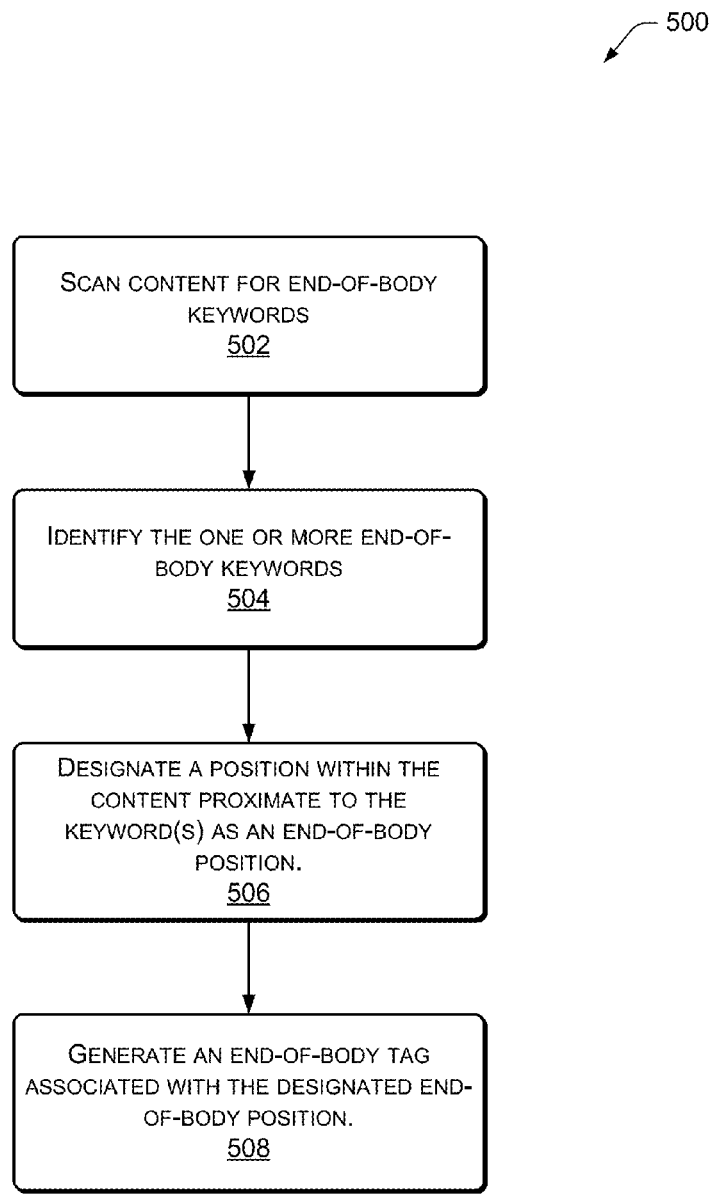
FIG. 5 is a flow diagram of an illustrative process of determining an end-of-body position based at least in part on one or more keywords in inline text.

FIG. 5 is a flow diagram of an illustrative process 500 of determining an end-of-body position based at least in part on one or more keywords in digital content. At 502, the content is scanned for end-of-body keywords. These end-of-body, or end-of-section, keywords are pre-determined words or phrases or character strings which are associated with a start, end, or transition between sections. For example, end-of-body keywords may include "THE END," or "FIN." Transitions between sections may be indicated by other keywords, such as "TABLE OF CONTENTS," "APPENDIX," "INDEX," and so forth. In some implementations, the capitalization or case of these phrases may be considered. For example, "The End" or "THE END" may be considered a keyword, while "the end" does not, to avoid determination of false breaks.

Once scanned, at 504, the one or more of the end-of-body keywords are identified. At 506, a position within the content proximate to the keywords is designated as an end-of-body position. This position may be relative to the type of break being designated and the specific keyword. For example, a position following the keyword "THE END" may be associated with the conclusion of body matter 302, while a position before the keyword "FOREWORD" may be associated with a beginning of front matter.

At 508, an end-of-body tag associated with the designated end-of-body position is generated. As described above, this end-of-body tag may be inline with the content, or external to it, such as in a separate formatting file. The association between the designated position and a given command may be accomplished by using an invariant reference to the text. For example, the end-of-body position may be designated as occurring after the $387^{th}$ line break, at byte count 557,179, and so forth.

Figure 6:
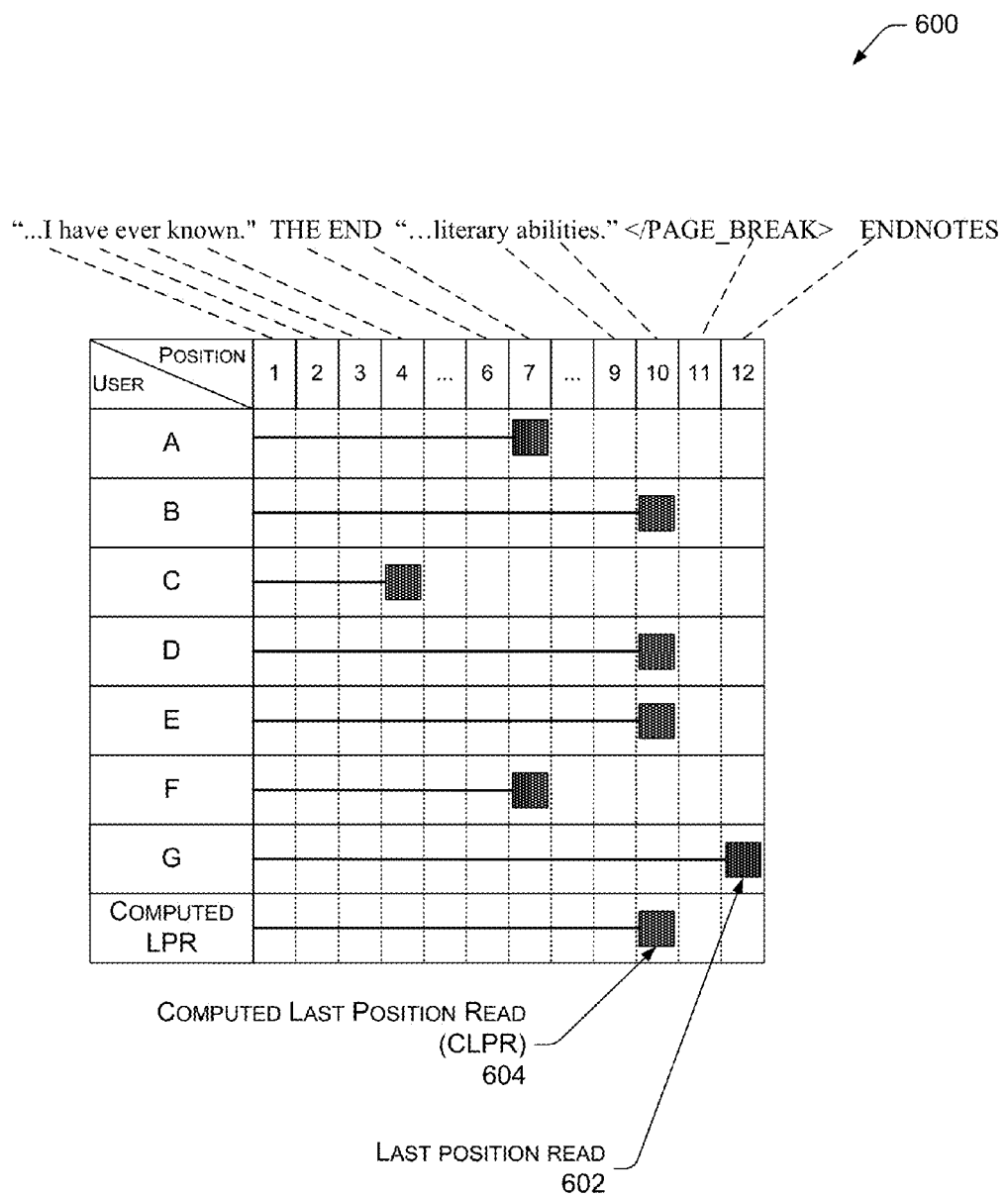
FIG. 6 is an illustrative table of the eBook tracking the last position read for several users, and a computed last position read.

FIG. 6 is an illustrative table 600 of a portion of the eBook and the last position read for several users. In this illustration, a portion of the text as shown in FIG. 3 is presented, with each word having a particular position within the content. The positions are arranged in this diagram horizontally, while inputs from users A-G and a computed last position read are arranged vertically. Positions may be associated with individual characters, words, collections of multiple words, sentences, paragraphs, images, and so forth.

As shown here, the usage of the eBook content by each of the plurality of users A-G has been gathered. When the user ceases to access the content, deletes the content from their device 104, or another action, the content processing module 112 may designate the position at which the user left off as the last position read 602. For example, as shown here, user A has a last position read of position 7 corresponding to the word "END."

By analyzing distribution of last positions read within the content, a computed last position read (CLPR) may be determined. For example, the last position read 602 for a majority of the users A-G was position 10, which is thus the computed last position read (CLPR) 604. As shown here, position 10 corresponds to the conclusion of the "Afterword" in the sample of FIG. 3. It is worthwhile to note that while the book designer may consider the "afterword" to be part of the back matter 304, users of a particular book may consider the "afterword" to be part of the body matter 302. For example, as shown in FIG. 6 above, the computed last position read 604 based on the last positions read 602 by users A-G was at the conclusion of the "afterword."

Figure 7:
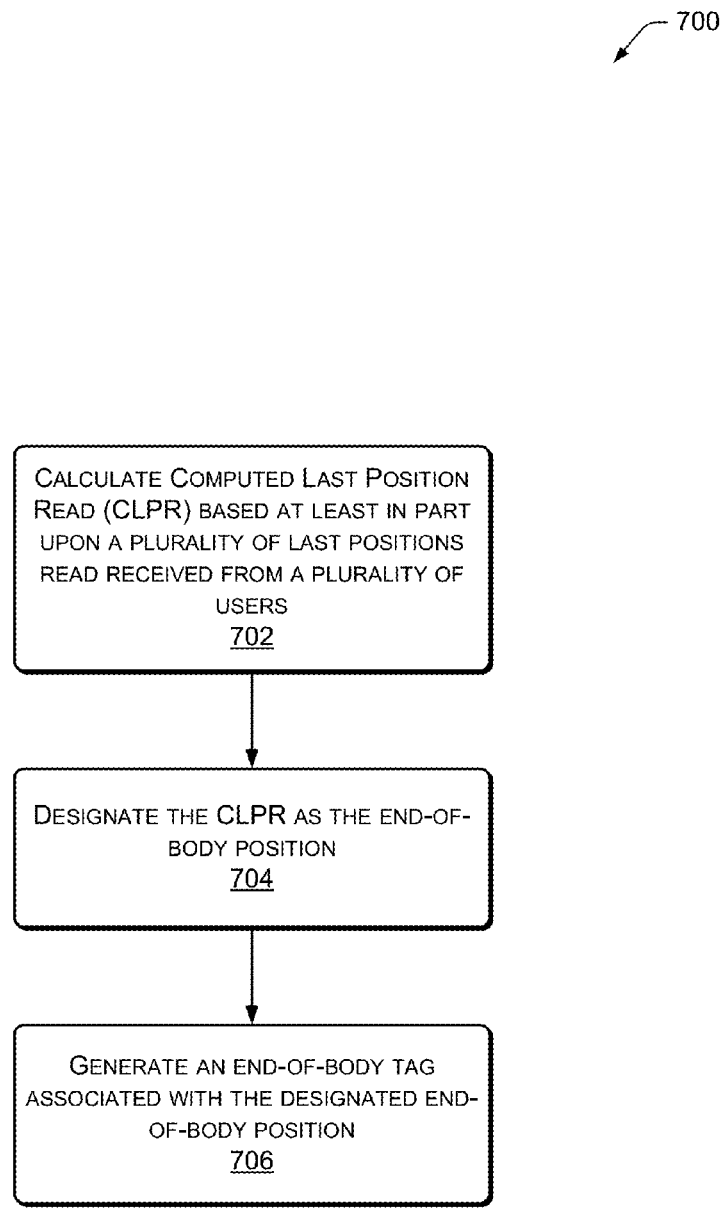
FIG. 7 is a flow diagram of an illustrative process of determining an end-of-body position based at least in part on a computed last position read.

FIG. 7 is an illustrative process 700 of determining an end-of-body position based at least in part on a computed last position read. At 702, a computed last position read (CLPR) is calculated based at least in part upon a plurality of last positions read by a plurality of users. For example, the CLPR may be calculated to be position 10 as derived from the last position read of a majority of users as described above with regards to FIG. 6.

At 704, the CLPR is designated as the end-of-the-body position. For example, as described above, the conclusion of the "afterword" may be considered the end of the body matter, at least by the users. In some implementations, such as described below with regards to FIG. 13, the determination may combine the CLPR with other factors such as proximity of page breaks.

At 706, as described above, an end-of-body tag is generated which is associated with the designated end-of-body position. This tag may then be used to affect presentation of the content to the user.

Figure 8:
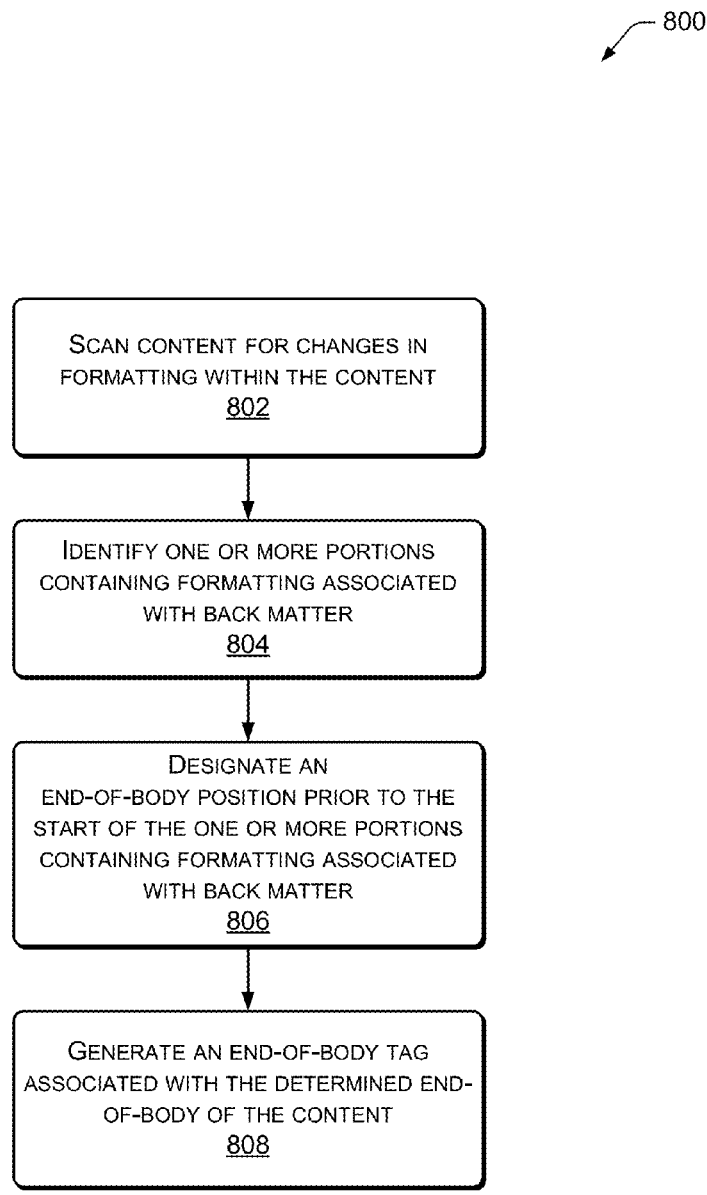
FIG. 8 is a flow diagram of an illustrative process of determining an end-of-body position based at least in part on changes of formatting.

FIG. 8 shows another illustrative process 800 of determining an end-of-body position based at least in part on changes of formatting. At 802, changes in formatting within the content are scanned for. These changes may be variations in font, spacing, indentation, tabs, color, presence of a drop cap, and so forth.

At 804, the one or more portions containing an indication of transition are identified, such as formatting consistent with back matter. For example, a transition from regular unjustified text to a portion of text formatted into a table may indicate a transition from body text to an index of the eBook. This portion of the text with the formatting may be designated a portion of a particular section, such as the back matter 304.

At 806, an end-of-body position is designated prior to the start of the one or more portions containing formatting associated with the back matter. For example, the body matter 302 comes before the index in the back matter 304, thus the end-of-body position is designated at a point in the eBook before the position where the index has been determined. At 808, an end-of-body tag associated with the determined end-of-body of the content is generated.

Figure 9:
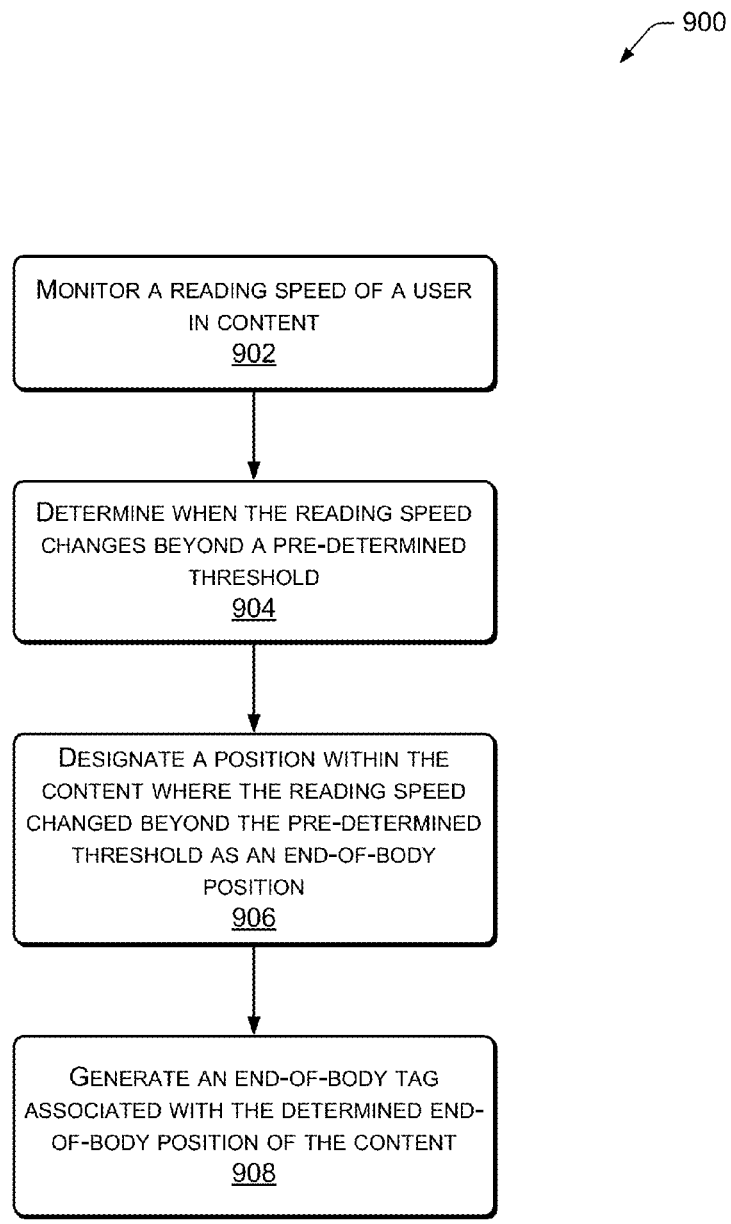
FIG. 9 is a flow diagram of an illustrative process of determining an end-of-body position based at least in part on changes in reading speed by users.

FIG. 9 is an illustrative process 900 of determining an end-of-body position based at least in part on changes in reading speed by users. In this implementation, at 902, a reading speed of a user in the content is monitored. Reading speed may be measured in several ways. For example, a count of the number of words on a page may be divided by the amount of time the user spent on the page to determine a number of words per minute.

In some implementations, a plurality of users may also be monitored, with the results generating a distribution of user speed. This distribution from the plurality of users may in turn be used to determine an overall change in reading speed by a population of users.

At 904, changes of the reading speed beyond a pre-determined threshold are determined. The pre-determined threshold may be a maximum, a minimum, or a bounded region. For example, the threshold may designate a minimum reading speed of 100 words per minute, and the user may have dropped to 50 words per minute at a given position.

At 906, a position where the reading speed changed beyond the pre-determined threshold is designated as an end-of-body position. For example, as described above, the abrupt decrease in reading speed may indicate the user is more slowly progressing through less readable back matter, such as end notes. At 908, an end-of-body tag associated with the determined end-of-body position is generated.

Figure 10:
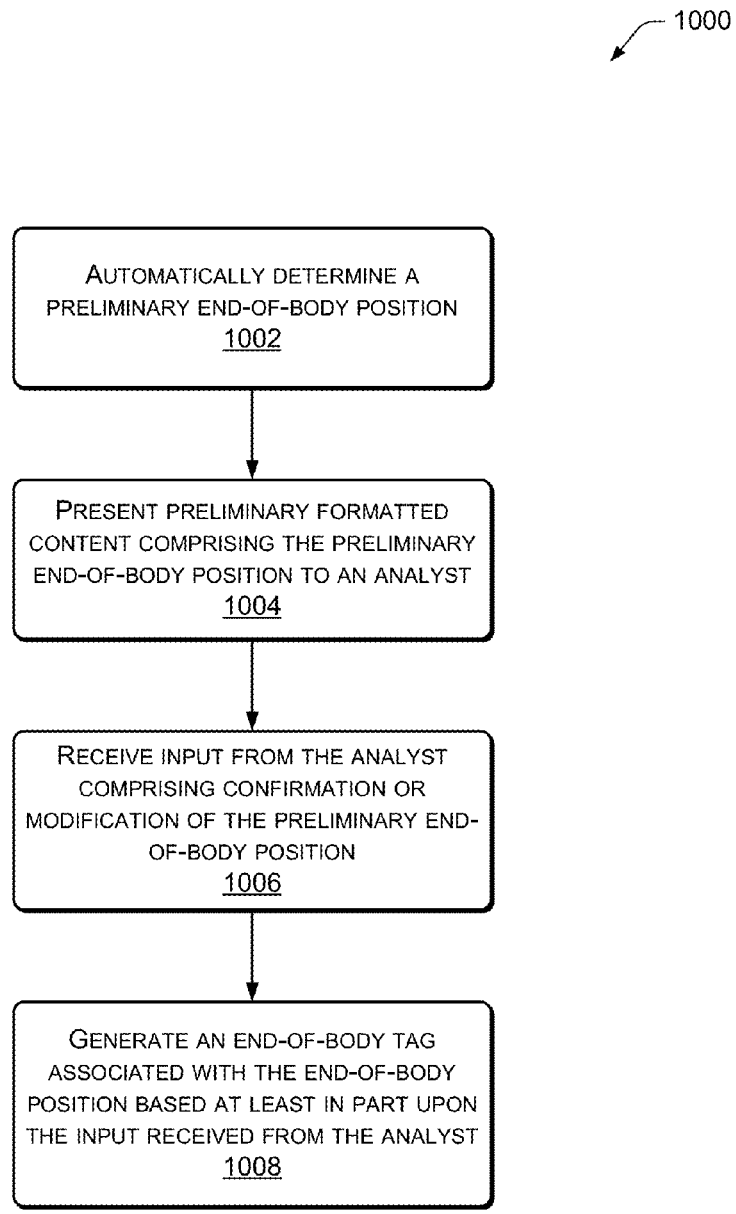
FIG. 10 is a flow diagram of an illustrative process of determining an end-of-body position based at least in part on input from a human analyst.

FIG. 10 shows another illustrative process 1000 of determining an end-of-body position that is based at least in part on input from a human analyst. In some circumstances, automatic determination of section breaks may produce variable results. For example, a dictionary or poetry book may not provide clear signals for the determinations described above with regards to FIGS. 5-9. Thus, in some implementations such as described next, it is beneficial to utilize a human analyst to confirm or modify the results of the automated system.

At 1002, breaks are automatically determined, such as a preliminary end-of-body position. This preliminary position, is combined with the original content 106 to form the preliminarily formatted content 114.

At 1004, the preliminarily formatted content 114 is presented to one or more of the human analysts 116(1)-(A). The analyst 116 views the preliminarily formatted content 114 and determines whether the automatically determined break is correct. The analyst 116 then confirms or modifies the automatically determined break.

At 1006, the confirmation or modification is received from the analyst 116. At 1008, based at least in part upon the analyst's 116 input, a tag such as an end-of-body tag associated with the determined end-of-body position is generated.

Figure 11:
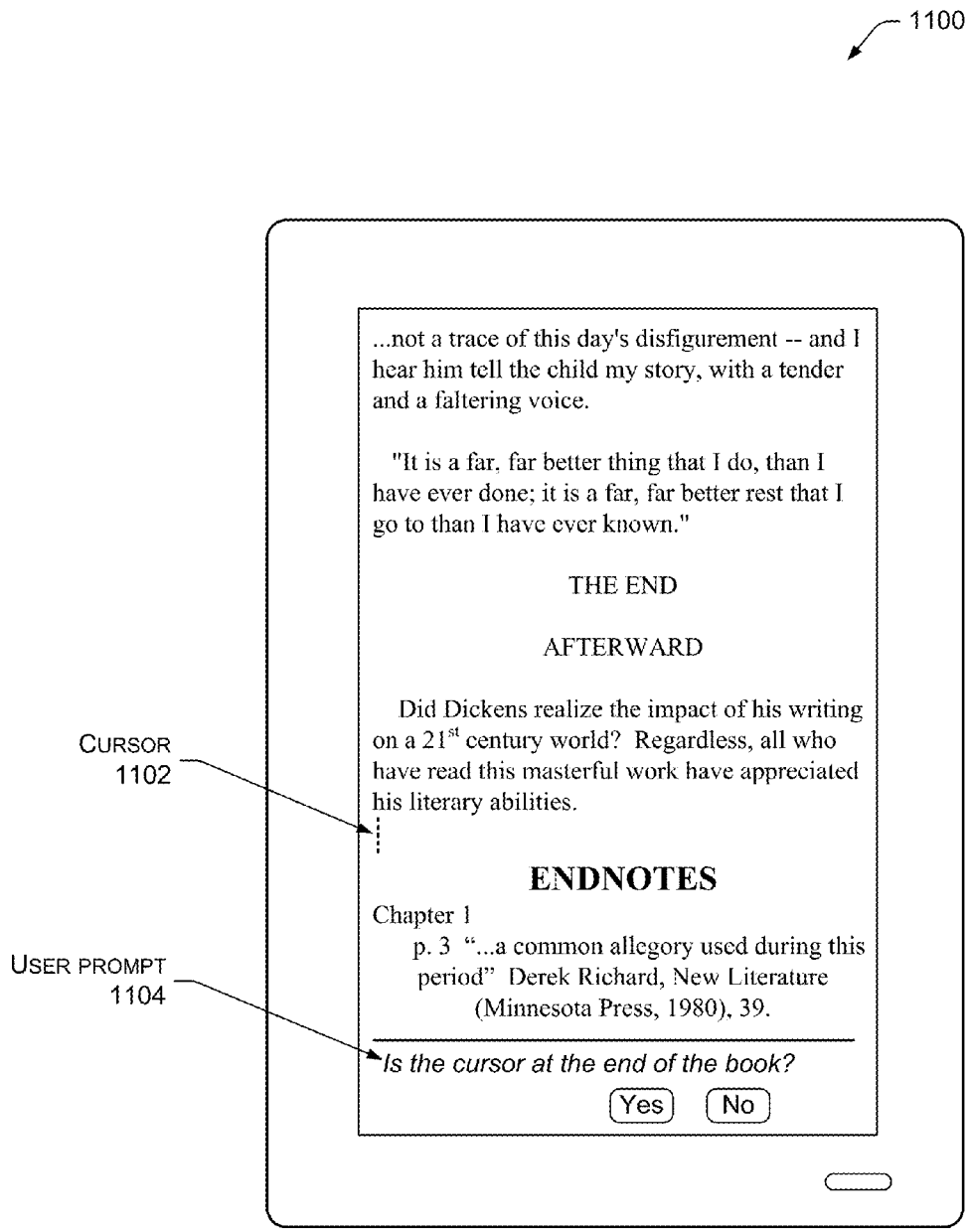
FIG. 11 is an illustrative user interface prompting a user to confirm when a cursor is at the end of the book.

FIG. 11 is an illustrative user interface 1100 prompting a user to confirm when a cursor is at the end of the book. In some implementations it may be desired to accept input from users 120 as they consume content. As shown here, a device 104 is presenting the end of the body matter 302 of the eBook, and the start of the back matter 304. A cursor 1102 is indicated in this example as a vertical broken line. In other implementations the cursor may be represented otherwise. As shown here, the cursor 1102 is positioned on the line immediately before the title "ENDNOTES."

Also presented by the device 104 is a user prompt 1104 asking the user 120 "Is the cursor at the end of the book?" and seeking a yes or no response. The user may thus respond, and the content processing module 112 may use the response to add, confirm or modify the end-of-book tag.

In some implementations, the content processing module 112 may vary the position of a break, and present the results to a plurality of users. By assessing the responses from a plurality of users, the content processing module 112 may determine where the actual section break, such as an end-of-body is.

Figure 12:
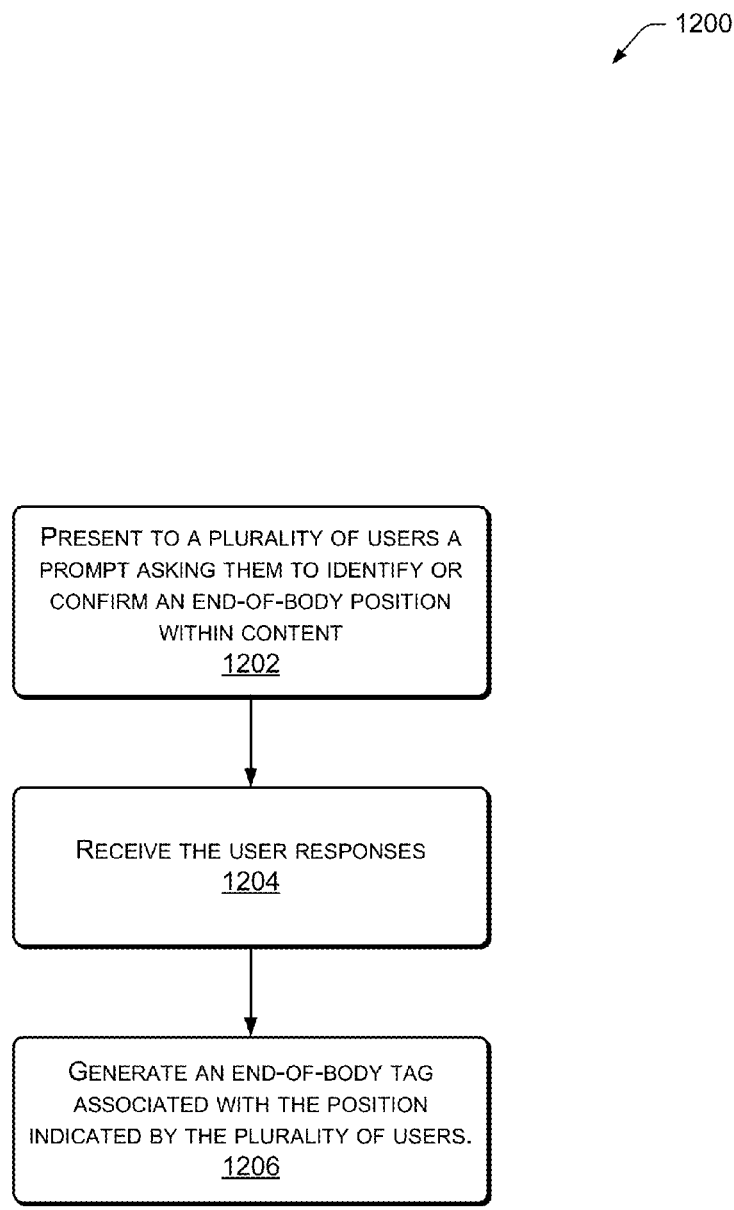
FIG. 12 is a flow diagram of an illustrative process determining an end-of-body position based at least in part on input from a user.

FIG. 12 is an illustrative process 1200 of determining an end-of-body position of content based at least in part on input from a consumer of the content. At 1202, a plurality of users are presented with prompts asking each to add, identify, or confirm a break or transition, such as the end-of-body position, within the content. As described above, the user interface 1100 may be used to present the prompt and acquire input from the user.

At 1204, the user responses are received. These users responses may be analyzed to look for trends and distributions. For example, some users may misinterpret a prompt, intentionally enter erroneous data, and so forth. However, the overall distribution of positions associated with a section break should typically indicate the actual section break.

At 1206, as above, an end-of-body tag associated with the position indicated by a number of users is generated. In some implementations, a pre-determined threshold of a count of users may be set, which would require that the threshold number of users must agree on a position for the position to be considered a break.

Figure 13:
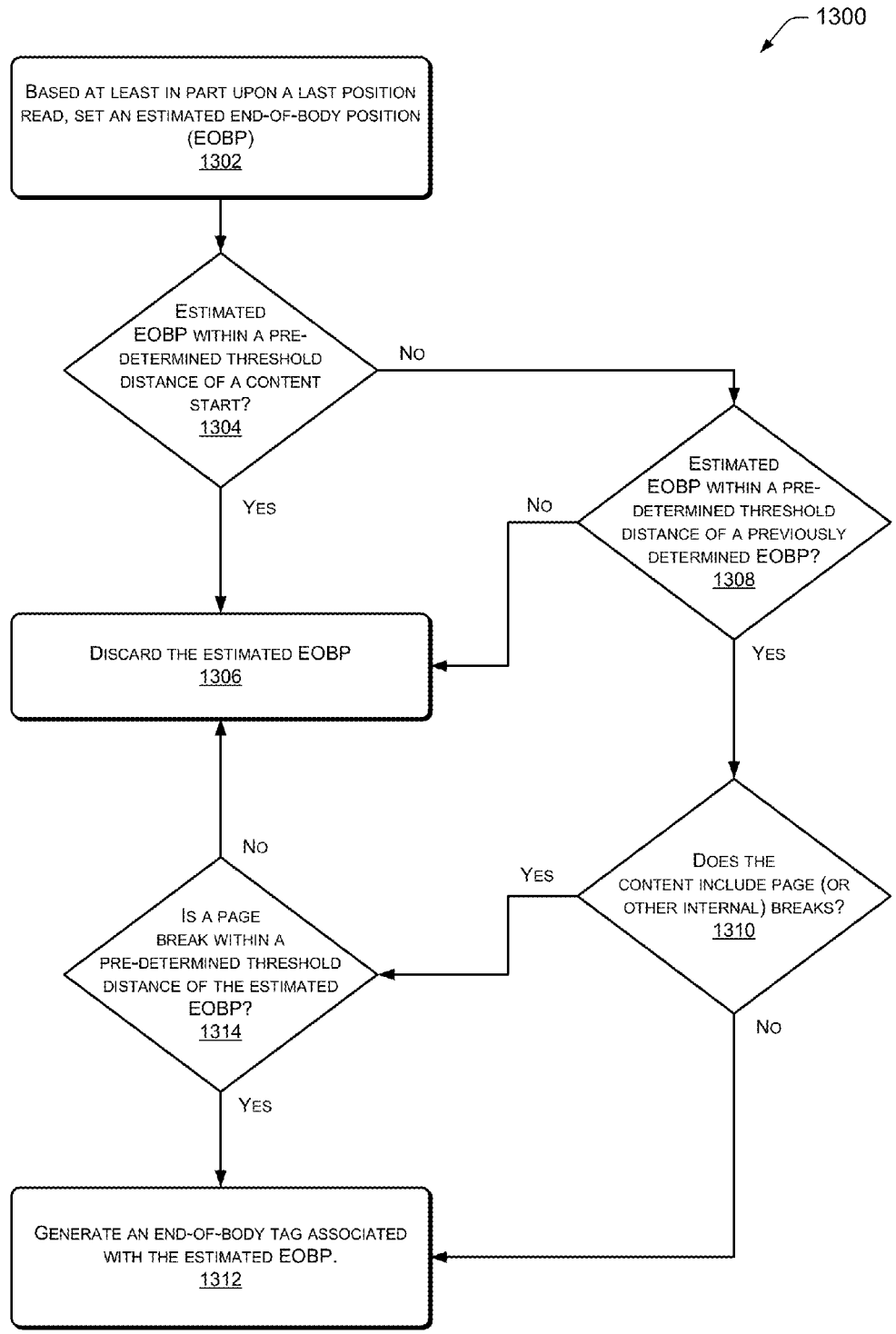
FIG. 13 is a flow diagram of an illustrative process of determining an end-of-body position on several factors such as distance from a content start position, proximity to a previously determined end-of-body, presence of page breaks, and so forth.

FIG. 13 is a flow diagram of an illustrative process 1300 of determining an end-of-body position on several factors such as distance from a content start position, proximity to a previously determined end-of-body, presence of page breaks, and so forth. As above, this process may be varied to determine the position of other breaks.

At 1302, an estimated end-of-body position (EOBP) is determined based at least in part upon a last position read or a computed last position read. This may be from one or a plurality of users.

At 1304, when the estimated EOBP is within a pre-determined threshold distance of a content start point, at 1306 the estimated EOBP is discarded. The content start point comprises the beginning of the content, such as the first word on the first page of a book. This check prevents the placement of the end-of-body position at or close to the beginning.

When at 1304 the estimated EOBP exceeds the pre-determined threshold distance of a content start point, then the process proceeds to 1308. At 1308, when the estimated EOBP exceeds a pre-determined threshold distance from a previously determined EOBP, the process proceeds to 1306 and discards the estimated EOBP. When at 1308 the estimated EOBP is within the pre-determined threshold distance from a previously determined EOBP or no previous EOBP exists, then the process proceeds to 1310. When at 1310 the content does not include page or other internal breaks, the process proceeds to 1312. At 1312, an end-of-body tag associated with the estimated EOBP is generated.

Returning to 1310, when the content includes internal breaks the process proceeds to 1314. At 1314, when one or more internal breaks are within a pre-determined threshold distance of the estimated EOBP, the process proceeds to 1312 to generate the end-of-body tag associated with the estimated EOBP. When at 1314 the one or more internal breaks exceed the pre-determined threshold distance to the estimated EOBP, the process proceeds to 1306 and discards the estimated EOBP.

Although specific details of illustrative methods are described with regard to the figures and other flow diagrams presented herein, it should be understood that certain acts shown in the figures need not be performed in the order described, and may be modified, and/or may be omitted entirely, depending on the circumstances. As described in this application, modules and engines may be implemented using software, hardware, firmware, or a combination of these. Moreover, the acts and methods described may be implemented by a computer, processor or other computing device based on instructions stored on one or more computer-readable storage media.

What is claimed is:

1. A method of formatting an electronic book (eBook), the method comprising:
   receiving an original content of the eBook, the original content of the eBook comprising partial formatting;
   analyzing, by a processor, text of the eBook to determine data corresponding to the original content of the eBook;
   receiving a plurality of last positions, wherein each last position of the plurality of last positions corresponds to the eBook and an individual user of a plurality of users;
   determining, by the processor, an end-of-body position within the original content of the eBook based at least in part on the data corresponding to the original content of the eBook and the plurality of last positions;
   adding additional formatting, by the processor, to the original content of the eBook, the additional formatting comprising an end-of-body tag associated with the end-of-body position; and
   generating a formatted eBook for presentation on an electronic device based at least in part on the additional formatting.

2. The method of claim 1, wherein adding additional formatting to the original content of the eBook comprises automatically inserting, by the processor, the end-of-body tag inline within the original content of the eBook.

3. The method of claim 1, further comprising:
   scanning the original content of the eBook for an end-of-body keyword;
   identifying the end-of-body keyword;
   designating a position within the original content of the eBook proximate to the end-of-body keyword as the end-of-body position; and
   generating the end-of-body tag associated with the end-of-body position.

4. The method of claim 1, wherein the determining the end-of-body position based at least in part on the data corresponding to the original content of the eBook and the plurality of last positions comprises:
   calculating a computed last position based at least in part on the plurality of last positions;
   designating the computed last position as the end-of-body position; and
   generating the end-of-body tag associated with the end-of-body position.

5. The method of claim 1, wherein the end-of-body position is a first end-of body position, the end-of-body tag is a first end-of-body tag, and further comprising:
   scanning the original content of the eBook for changes in formatting;
   identifying one or more portions of the eBook containing formatting associated with back matter;
   designating a position prior to a start of the one or more portions of the eBook containing formatting associated with back matter as a second end-of-body position; and
   generating a second end-of-body tag associated with the second end-of-body position.

6. The method of claim 1, wherein the end-of-body position represents a first end-of body position, the end-of-body tag represents a first end-of-body tag, and further comprising:
   monitoring a reading speed of a user in the original version of the eBook;
   determining a position within the original content of the eBook at which the reading speed of the user changed beyond a threshold amount;
   designating the position as a second end-of-body position; and
   generating a second end-of-body tag associated with the second end-of-body position.

7. The method of claim 1, wherein the end-of-body position represents a first end-of body position, the end-of-body tag represents a first end-of-body tag, and further comprising:
   prompting the plurality of users to identify or confirm a position of an end of body matter within the original version of the eBook;
   receiving responses from the plurality of users;
   in response to determining that a threshold number of users agree on the position of the end of body matter, designating the position of the end of body matter as a second end-of-body position; and
   generating a second end-of-body tag associated with the second end-of-body position.

8. The method of claim 1, wherein the determining the end-of-body position based at least in part on the data corresponding to the original content of the eBook and the plurality of last positions comprises:
   based at least in part on the plurality of last positions, setting an estimated end-of-body position (EOBP);
   determining that the estimated EOBP exceeds a first pre-determined threshold distance from an eBook start point;
   determining that the estimated EOBP is within a second pre-determined threshold distance from a previously determined EOBP or that no previous EOBP exists;
   determining that one or more internal breaks are within a third pre-determined threshold distance of the estimated EOBP; and
   generating the end-of-body tag associated with the estimated EOBP.

9. A non-transitory computer-readable storage media storing instructions that when executed instruct a processor to perform acts comprising:
   receiving an original version of content;
   receiving a plurality of last positions within the content;
   based at least in part upon the plurality of last positions, setting an estimated end-of-section position (EOSP);
   based at least in part on the estimated EOSP, determining an end-of-section position within the content; and
   in response to determining the end-of-section position, formatting the content with an end-of-section tag associated with the end-of-section position.

10. The non-transitory computer-readable storage media of claim 9, storing further instructions that when executed instruct the processor to perform acts comprising determining that the estimated EOSP is within a predetermined threshold distance of a content start point and discarding the estimated EOSP.

11. The non-transitory computer-readable storage media of claim 9, wherein the content comprises an eBook.

12. The non-transitory computer-readable storage media of claim 11, wherein the section comprises body matter of the eBook.

13. The non-transitory computer-readable storage media of claim 9, wherein the formatted content comprises the original version of the content and a separate formatting file comprising the end-of-section tag.

14. The non-transitory computer-readable storage media of claim 9, storing further instructions that when executed instruct the processor to perform acts comprising:
   scanning the content for end-of-section keywords;
   identifying one or more end-of-section keywords;

designating a position within the content proximate to the one or more end-of-section keywords as a different end-of-section position; and generating a different end-of-section tag associated with the different end-of-section position.

15. The non-transitory computer-readable storage media of claim 9, wherein each last position of the plurality of last positions corresponds to an individual user of a plurality of users and storing further instructions that when executed instruct the processor to perform acts comprising:

determining a computed last position based at least in part on the plurality of last positions;

designating the computed last position as a different end-of-section position; and generating a different end-of-section tag associated with the different end-of-section position.

16. The non-transitory computer-readable storage media of claim 9, storing further instructions that when executed instruct the processor to perform acts comprising:

scanning the content for changes in formatting;

identifying a portion containing formatting associated with a subsequent section;

designating a position prior to a start of the portion containing formatting associated with the subsequent section as a different end-of-section position; and generating a different end-of-section tag associated with the different end-of-section position.

17. The non-transitory computer-readable storage media of claim 9, storing further instructions that when executed instruct the processor to perform acts comprising:

monitoring a reading speed of a user in the content;

determining that a change in the reading speed of the user changed beyond a threshold amount, wherein the change in reading speed corresponds to a position within the content;

designating the position as a different end-of-section position; and generating a different end-of-section tag associated with the different end-of-section position.

18. The non-transitory computer-readable storage media of claim 9, storing further instructions that when executed instruct the processor to perform acts comprising:

prompting a plurality of users to indicate an end of a section within the content;

receiving responses from the plurality of users;

in response to determining that a threshold number of users have indicated a position of the end of the section, designating the position as a different end-of-section position; and generating a different end-of-section tag associated with the different end-of-section position.

19. The non-transitory computer-readable storage media of claim 9, storing further instructions that when executed instruct the processor to perform acts comprising:

determining that the estimated EOSP exceeds a first pre-determined threshold distance from a content start point;

determining that the estimated EOSP is within a second pre-determined threshold distance from a previously determined EOSP:

determining that the content does not include internal breaks; and generating an additional end-of-section tag associated with the estimated EOSP.

20. A system comprising:

a processor;

a memory, coupled to the processor;

a content processing module stored within the memory and, when executed by the processor, causes the processor to:

determine that a reading speed changed beyond a threshold amount at a position within digital content;

determine a transition between sections within the digital content based at least in part on the position within the digital content at which the reading speed changed beyond the threshold amount; and format the digital content with a section break tag associated with the transition between the sections.

21. The system of claim 20, wherein the sections comprise at least two of front matter, body matter, and back matter of an eBook.

22. A non-transitory computer-readable storage media storing instructions that when executed instruct a processor to perform acts comprising:

determining that a reading speed changed beyond a threshold amount at a first position within digital content;

indicating the first position as a preliminary position of a break between sections within the digital content;

displaying at least a portion of the digital content to a plurality of users;

prompting the plurality of users to confirm the preliminary position of the break between sections within the digital content;

accepting user responses from the plurality of users;

determining that a threshold number of users confirmed the preliminary position of the break;

determining a confirmed position of the break between sections based at least in part on the determining that the threshold number of users confirmed the preliminary position of the break between sections; and providing an indication of the confirmed position of the break between sections to a content processing module configured to format the digital content.

23. The non-transitory computer-readable storage media of claim 22, wherein the sections comprise at least two of front matter, body matter, and back matter of the digital content.

* * * * *